United States Patent Office 2,807,964
Patented Oct. 1, 1957

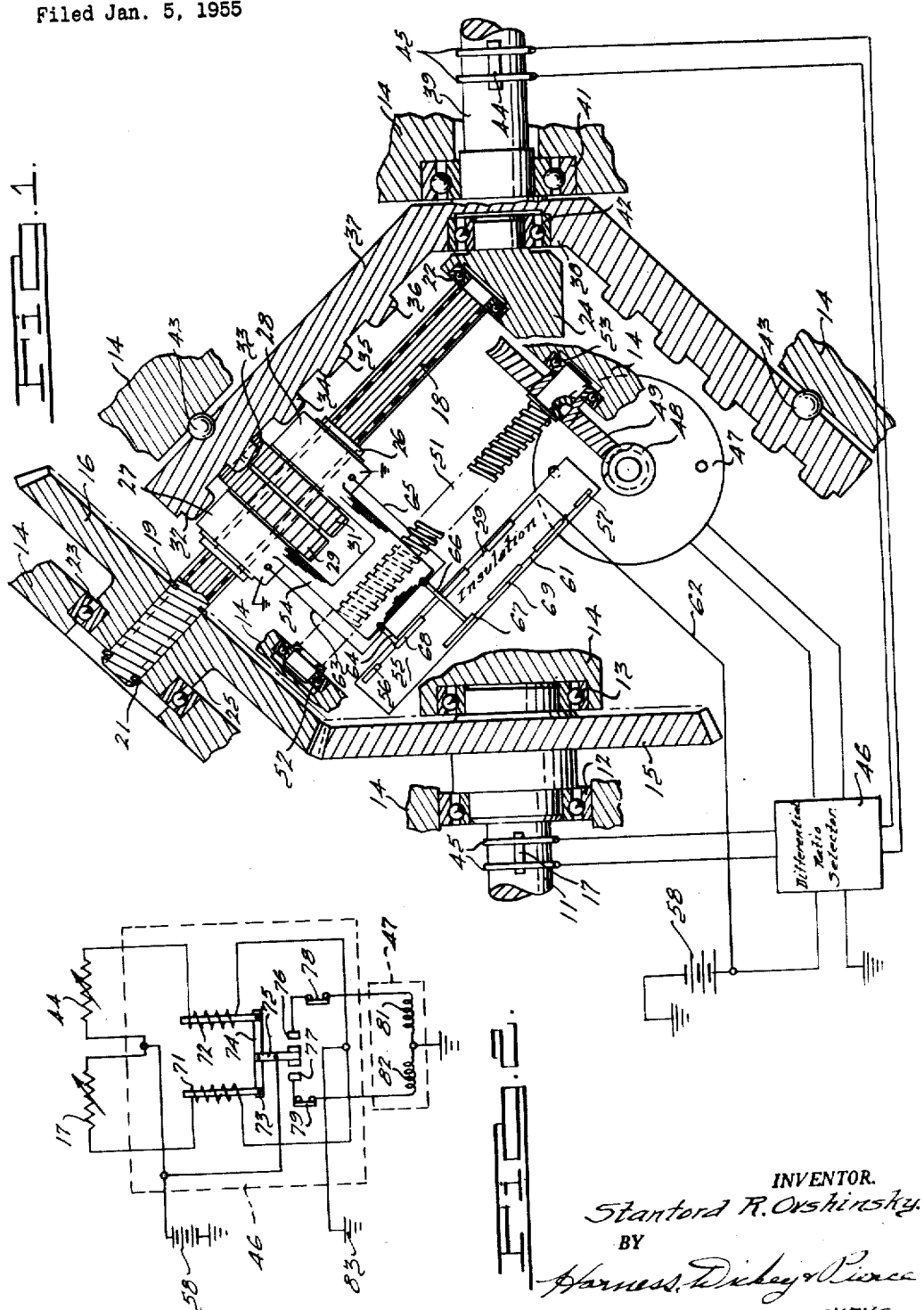

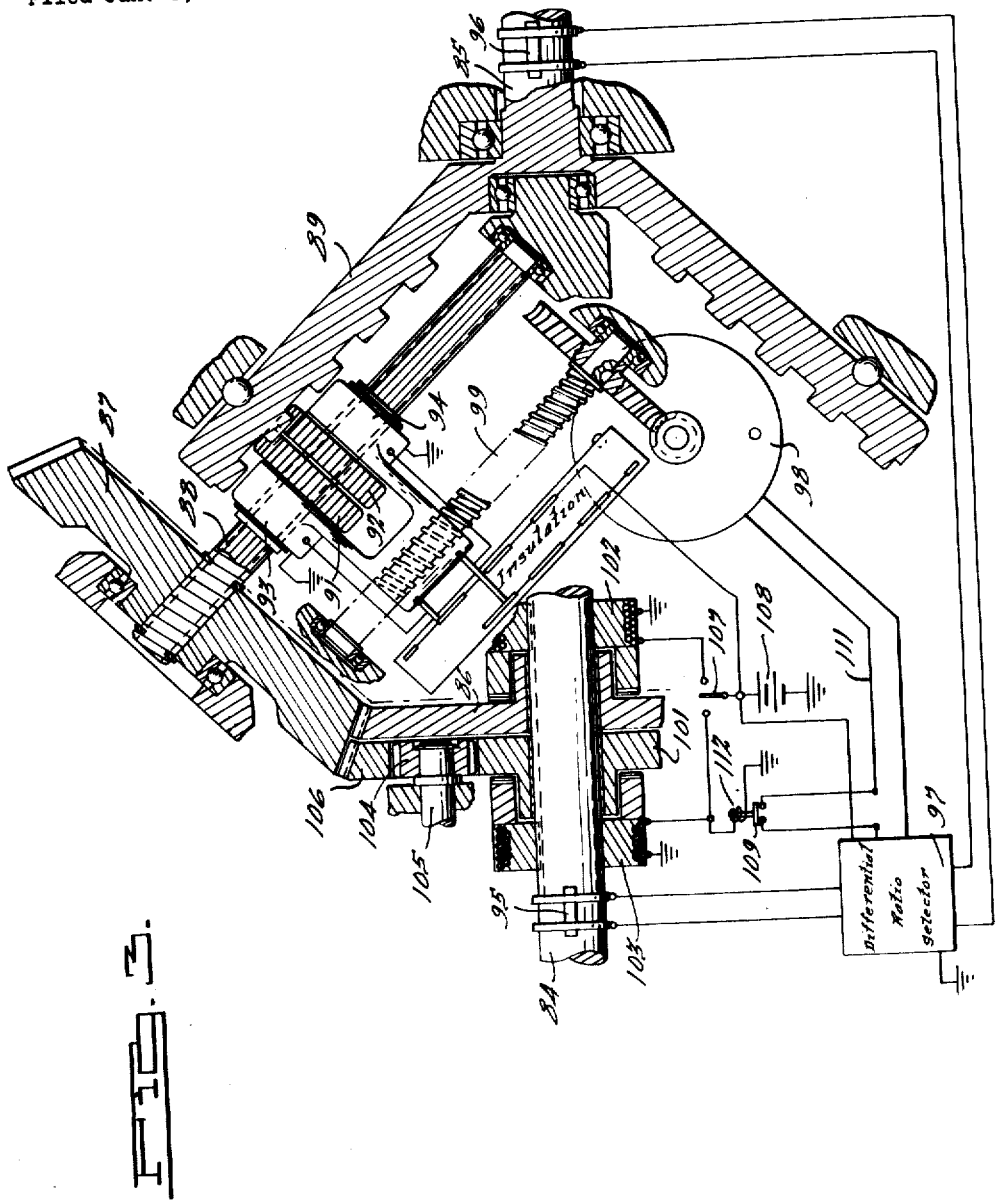

2,807,964

AUTOMATIC TRANSMISSION

Stanford R. Ovshinsky, Detroit, Mich., assignor to Hupp Corporation, Cleveland, Ohio, a corporation of Virginia Application January 5, 1955, Serial No. 479,914

23 Claims. (Cl. 74—348)

The present invention relates to automatic transmission systems, and more particularly to a mechanical transmission for a motor vehicle or the like having its gear ratio automatically adjusted in accordance with prevailing operating conditions.

Inefficiencies in various types of automatic transmissions have long been evident in the automotive field. In the hydraulically operated type of automotive transmission, considerable power and fuel is wasted because of slippage between the driving elements, whereas in straight mechanical types of transmissions, in which the elements are directly driven by interchanging components, the transmission is generally limited in its ability to provide the proper gear ratio for each speed and load condition, so that much of the power of the driving engine is inefficiently utilized.

It is one object of the present invention to provide a novel automatic transmission for a motor vehicle or the like which overcomes the difficulties heretofore encountered and embodies an electromechanical type of transmission, the gear ratios of the transmission being automatically adjusted in accordance with the comparative speed and torque conditions prevailing at the engine and at the output end in the manner of a closed-loop servomechanism.

Another object of the present invention is the provision of a transmission which automatically determines and quickly provides the proper gear ratio for each speed and load condition.

A further object is to provide an automatic transmission of the above type which is highly efficient in operation, is free of hydraulics, and includes the use of electromagnetic clutches which decrease shock and increase the smoothness of shifting.

It is also an object to provide an automatic transmission having the above characteristics which provides a large range of gear ratios, with relatively smooth transition within this range.

Still another object of the present invention is the provision of an automatic transmission of the mechanical type as above described utilizing an electrical control arrangement, and in which the electrical circuits can be modified to suit various sensitivity and range requirements.

A still further object of the present invention, in one form thereof, is the provision of an automatic transmission having the above characteristics, which includes a reverse drive as well as a forward drive, and in which the automatic shifting feature can be cut out when the transmission is in reverse.

With these and other objects in view, as will hereinafter more fully appear, and which will be more particularly pointed out in the appended claims, reference is now made to the following description taken in connection with the accompanying sheet of drawings in which:

Figure 1 is a side elevational view, in section and partly schematic, of an automatic transmission comprising a preferred embodiment of the present invention;

Figure 2 is a diagrammatic showing of a typical differential ratio-selector which may be employed in the automatic transmission of Figure 1; and Figure 3 is a view similar to Figure 1 of a modified form of the invention incorporating a reverse drive.

The present invention provides an automatic transmission for use in a motor vehicle or the like wherein the gear ratios of the transmission are adjusted under the control of an electrical ratio-selector mechanism. With this mechanism, the input power available to the transmission is compared with the measured torque requirements of the driven component, such as a motor vehicle, for deriving a differential signal component whenever the input power available differs from the output torque requirements. This differential signal component is then utilized to drive a reversible electric motor which in turn operates to slidably position a pair of driving electromagnetic clutch-operated coupling gears into selective meshing engagement with a driven output member. The output member and coupling gears operate on the principle of a variable ratio friction drive disk mechanism wherein a variable ratio range may be selected by positioning the coupling gears through the range of locus diameters on the output member. To accommodate the coupling gears and to provide a positive drive, the output member includes a plurality of spaced ring gears suitably formed on the internal surface thereof, whereby the meshing engagement of the coupling gears with a ring gear located on the outer edge of the output member will provide a high input-to-output gear ratio and the engagement between the coupling gear and succeeding inner ring gears will produce correspondingly lower ratios. Through the differential ratio selector, the coupling gears are automatically shifted between these ring gears to provide the proper gear ratio in the transmission for each speed and load condition encountered. The change in gear ratios causes a corresponding change in the differential signal component, in the manner of feedback in a closed-loop servomechanism, to stop the coupling gears in their new position or to reverse their movement until an equilibrium condition is obtained.

Referring more particularly to the drawings, there is shown in Figure 1 an automatic transmission illustrating a preferred embodiment of the invention, including an input shaft 11 rotatably journaled within suitable bearings 12 and 13 in a transmission housing shown fragmentarily at 14. A bevel gear 15 is fixed on shaft 11 and serves to transmit power from the shaft to a bevel gear 16. Also mounted on the input shaft is a suitable torque measuring instrument 17 which, as will hereinafter be more fully described, serves to provide an electrical signal indication of the input torque applied by a suitable power source (not shown) connected to the input shaft.

Bevel gear 16 is mounted on a splined coupling shaft 18 and locked thereon against slidable movement by a pair of retaining rings 19 and 21. Shaft 18 is mounted within housing 14 at an angle of approximately 45° with the axis of the input shaft and is rotatably journaled therein, at its ends, by bearings 22 and 23. Bearing 22 supporting the inner end of shaft 18 is seated in a counterbore formed within an extension 24 of housing 14, while outer bearing 23 engages a hub 25 on bevel gear 16 and is fitted within a counterbore in the outer portion of the housing. Bearings 22 and 23 serve to take the thrust and radial loads on shaft 18.

Slidably mounted upon shaft 18 is a splined sleeve 26 supporting a pair of electromagnetic clutches 27 and 28 of any suitable type which have associated therewith pinions 29 and 31 respectively. These pinions are adapted to selectively engage a plurality of spaced internal ring gears 32, 33, 34, 35 and 36 formed on the inner surface of conical output member 37 as hereinafter described. Pinions 29 and 31 are rotatably mounted on sleeve 26, and when clutches 27 and 28 are energized they connect their respective pinions to sleeve 26. Since the sleeve is splined to shaft 18, the shaft drives member 37 at a speed dependent upon which of the internal ring gears is engaged. Pinions 29 and 31 are mounted adjacent each other, with the clutches placed outwardly therefrom. The edges of the gear and pinion teeth may be tapered for ease in meshing.

Output member 37 is axially aligned with input shaft 11 and comprises a cone-shaped member terminating in a flat apex portion 38. Member 37 is fixedly connected at the apex portion to an output shaft 39 which is supported by a bearing 41 in housing 14. An additional bearing 42 on extension 24 of housing 14 may be provided for these parts, as well as bearings 43 between the outer surface of member 37 and housing 14.

Each of the ring gears 33 to 36 are radially situated on the conical member at different locus diameters. The tooth width of each ring gear and the space between adjacent gears are such that about half of one pinion can mesh with one gear while half of the other pinion meshes with an adjacent gear. It will be apparent that during driving engagement of the pinions with the largest ring gear 32 the transmission will produce a high input-to-output gear ratio while engagement of the pinions with succeedingly smaller ring gears will produce correspondingly lower input-to-output ratios. In the illustrated embodiment the engagement of the pinions with ring gear 35 provides a 1:1 ratio while engagement with ring gear 36 will provide an overdrive ratio. Although the conical member is shown as having a total of five ring gears for providing five discrete gear ratios, it is contemplated that additional ring gears may be incorporated in the unit for providing a greater overall ratio range or for providing smaller ratio increments between adjacent ring gears for a given input-to-output ratio range. While only one set of coupling pinions 29, 31 is shown in the illustrated embodiment, the invention contemplates other arrangements.

Suitably mounted on output shaft 39 is a second torque measuring instrument 44 which serves to provide an electrical signal indication of the output shaft torque. Torque measuring instruments 17 and 44 may comprise any suitable means for measuring the input and output shaft torques of the transmission and may include inductive measuring devices, instrumentations or the like. In the illustrated embodiments, each of the units 17 and 44 comprises a strain gage suitably fastened to the shaft as by an adhesive substance, such that any distortion in the shaft will similarly distort the size and shape of the gage. The strain gages may be of the known type wherein the internal electrical resistances of the units have a constant normal value when in an unstressed condition but the resistance value will vary in accordance with the distortion of the unit. Inasmuch as each of the shafts are subjected to stresses of varying intensity whenever an unbalanced load is acting between them, the shafts will be slightly distorted, for example twisted or bent, whenever these stresses are present. Since the gages are secured to the shafts, this distortion will similarly distort the strain gages to cause the resistance value of the gages to change in proportion to the stresses.

The variation in the resistances of the strain gages 17 and 44 and hence the relative values of current flow through the gages, which serves as a signal indication, is taken from the rotating shafts 11 and 39 through slip rings 45, and fed to a suitable differential ratio selector indicated at 46. The input torque available at shaft 11 as measured by gage 17 and torque reaction at shaft 39 as measured by gage 44 are compared in differential ratio selector 46 so that whenever there is an unbalance of torque between the input and output shafts the ratio selector functions to produce a differential motor control signal. This signal operates to control the movement of a reversible electric motor 47 which is used to position coupling gears 29 and 31. It should be understood that other sources of rotary power could be used for positioning the coupling gears. The electrical circuits comprising unit 46 and its connection with motor 47 are described in detail below.

Motor 47 is mounted in housing 14 normal to shaft 18 and has a worm 48 attached to its armature shaft. This worm meshes with a worm wheel 49 fixed on a positioning screw shaft 51. Shaft 51 is rotatably mounted in parallel relation with spline shaft 18 by suitable bearings 52 and 53 in housing 14.

Rotation of the shaft 51 produces a translation of spline sleeve 26 and pinions 29 and 31 through the medium of a bifurcated traveling guide nut 54. The guide nut is threaded on shaft 51 and has legs straddling pinions 29 and 31 and secured to the housings of clutches 27 and 28. It will be seen that from this structure that rotation of motor 47, which is under control of differential ratio selector 46, will drive worm 48, worm wheel 49, shaft 51, and hence drive the pinions through the traveling nut along spline shaft 28. Thus the pinions may be selectively positioned in engagement with any one of the output ring gears 32 to 36. It should be noted that during this movement pinions 29 and 31 will at certain positions engage the same ring gear and at alternate positions engage adjacent ring gears.

The energization of electromagnetic clutches 27 and 28 and thus the driving of the pinions is controlled by a clutch control terminal board comprising an insulative strip 55 having a plurality of spaced electrical contact segments secured on its surface. The contact segments are arranged in succession along two parallel lines with the left end contact segment 56 in the outer line and the right end contact segment 57 in the inner line having approximately one-half the length of the other segments. Each of the segments in the two lines are electrically connected together and to a suitable power source 58 by way of branch leads 59 and 61 and main lead 62. The outer line of segments are individually connectible to the energizing winding of clutch 27 through a lead 63 and a slidable contact 64 while the inner line of segments are individually connectible to the energizing winding of clutch 28 through a lead 65 and a slidable contact 66. The slidable contacts are spaced from each other approximately the same distance as the total width of pinions 29, 31 and are insulatively mounted on nut 54 for movement therewith. As such, the magnetic clutches 27 and 28 are capable of being selectively energized separately or together along their entire path of movement by the engagement of the contacts with the contact segments.

The arrangement of the clutch terminal board and the pinions is such that the pinions have a walking effect relative to the outupt ring gears as far as driving is concerned, so that the pinions can mesh and unmesh while they are idling. Each clutch is energized for driving its pinion whenever such pinion has established an approximately 50% or greater mesh with an associated ring gear. Each clutch is de-energized for permitting its pinion to freewheel whenever the mesh between the pinion and a ring gear is less than about half.

The overall operation of the transmission will become more apparent from the following operating description of the unit. Assuming the parts are in the position shown in Figure 1, the input and output shaft torques have been constant, and clutches 27 and 28 are energized, pinions 29 and 31 are meshing with ring gear 33 and driving output conical member 37. Should the torque on output shaft 39 decrease, this variation in forces will be reflected in strain gages 17 and 44, whereby ratio selector 46 will produce a differential control signal energizing motor 47 in a desired direction. In this instance, the motor will be rotated for moving pinions 29 and 31 inwardly along shaft 18. Consequently, the contacts 64 and 66 carried by the traveling guide nut will slide along terminal strip 55. When pinion 31 moves to a point where its engagement with ring gear 33 is less than about 50%, contact 66 will disengage segment 67 and clutch 28 will be de-energized, so that pinion 31 freewheels. In the meantime, as the coupling unit continues to slide inwards, clutch 27 remains energized until freewheeling pinion 31 establishes a 50% mesh with ring gear 34. At this point, pinion 29 has less than 50% mesh with ring gear 33 and contact 64 associated with clutch 27 leaves segment 68 to de-energize this clutch. Pinion 29 now freewheels. At the same time, contact 66 engages segment 69 and re-establishes the driving condition of pinion 31. Member 37 is now being driven at a new ratio. The pinions continue to walk inwardly until the input and output shaft torques on the shafts again balance. A similar sequence of events occurs during an outward movement of the pinions to provide a higher gear ratio, which would occur if the torque on output shaft 39 increases or the torque on input shaft 11 decreases. End gears 32 and 36 will be driven only by pinions 29 and 31 respectively due to the arrangement of segments 56 and 57.

It will be apparent that the freewheeling of the pinions allows them to make a smooth engagement with the adjoining ring gear and prevents the two pinions from driving adjacent ring gears simultaneously. The walking effect of the pinions is very rapid and because of this walking effect and the construction of the various components, including the electromagnetic clutches which allows a certain amount of slippage, very little shock is evidenced in the transmission. Although the illustrated embodiment uses five different gear ratios, it should be understood that the invention contemplates the selective use of a different number of ratios, and that the transmission could be limited to a smaller number of ratios through conventional manual switching arrangements. If desired, some damping means could be placed in the electrical circuit to prevent minor variations in torque from causing shifting.

Although any suitable differential ratio selector 46 may be employed in the transmission, one possible type of ratio selector is shown in Figure 2. In this circuit, strain gages 17 and 44 are connected in series with energizing windings 71 and 72 respectively of a balanced relay 73 and across the power source 58 forming a balanced current circuit. The relay includes a pivoted armature 74 having a contact arm 75 adapted to engage a pair of contacts 76 and 77 upon movement of the armature from a central balanced position intermediate the contacts. Contacts 76 and 77 are connected through limit switches 78 and 79 respectively to opposite terminals of a pair of motor field windings 81 and 82. The windings are associated with motor 47 in such a manner that depending upon which winding is energized, the motor will rotate in a clockwise or counterclockwise direction.

The operation of this circuit is as follows: Whenever the resistances of gages 17 and 44 are substantially equal, the current flowing from power source 58 will be equally divided in the current bridge so that one-half will flow through resistance 44, winding 72 and back to the power source through a ground indicated at 83 while the other half will flow through resistance 17, winding 71 and back to the power source through ground. Due to the equal current flow through the two windings 71, 72 the magnetic flux generated by each will be substantially the same and contact arm 75 will remain in its balanced and disengaged position.

Should the output shaft torque increase and gage 44 be affected to increase its resistance, there will be a correspondingly lesser current flowing through this resistance. Accordingly, a greater current will flow through winding 71 than winding 72 and contact 75 will be moved clockwise engaging contact 77. This closes the field winding circuit from the power source whereby current will flow through limit switch 79 and field winding 82 back to the power source through ground. The energization of field winding 82 will cause motor 47 to rotate in a direction to move pinions 29, 31 into a higher ratio until input shaft 11 again balances the torque requirements of the output shaft. When this occurs, the stresses in the shafts and hence the resistance of the gages will change to balance the circuit, and arm 75 will disengage contact 77. Upon disengagement, the motor stops and remains stationary until the forces on the two shafts again become unbalanced whereupon the cycle is repeated to again change the gear ratios of the transmission. Limit switches 78 and 79 are preferably positioned adjacent the ends of shaft 51 and are adapted to be engaged by guide nut 54 whenever it reaches the end of the shaft for de-energizing the motor.

Figure 3 illustrates another embodiment of the invention which is generally similar to that of Figures 1 and 2 but which incorporates additional means for reversing the direction in which the output shaft is driven by the input shaft. Such an arrangement is of obvious utility in automotive vehicles wherein a range of forward gear ratios and at least a single reverse gear ratio is desired. An input shaft 84 and an output shaft 85 are shown, the input shaft being provided with a drive gear 86 similar to gear 15 of Figure 1. This gear meshes with a gear 87 mounted on a coupling shaft 88, the coupling shaft being parallel to the side of cone-shaped driven member 89 connected to output shaft 85. A pair of coupling pinions 91 and 92 are slidably mounted on coupling shaft 88 as in the previous embodiment, these pinions being connectible with the coupling shaft by electromagnetic clutches 93 and 94 respectively. Shafts 84 and 85 are provided with strain gages 95 and 96 respectively which are connected to differential ratio selector 97. The output signal from the ratio selector controls positioning motor 98 which drives positioning screw shaft 99 for moving coupling pinions 91 and 92. These parts operate in the same manner as in the previous embodiment.

The reverse drive is accomplished by providing an additional driving gear 101 mounted on input shaft 84. Both driving gears 86 and 101 are rotatably mounted on input shaft 84, and their connection to this shaft is controlled by a pair of electromagnetic clutches 102 and 103 respectively. Reverse driving gear 101 is connected to gear 87 through a plurality of circumferentially spaced idling pinions 104, one of which is shown in Figure 3. Pinions 104 are mounted on fixed stub shafts 105, and support a ring bevel gear 106 which meshes with gear 87. It will be seen that with this arrangement gear 101 drives shaft 88 in the reverse direction from that imparted by gear 86, and at a reduced rate of speed.

Clutches 102 and 103 are selectively energized by means of a manual single pole-double throw switch 107. When swung to the right in Figure 3, switch 107 will connect power source 108 to the energizing winding of clutch 102, connecting driving gear 86 to the coupling elements. When switch 107 is swung to the left clutch 103 will be energized and clutch 102 de-energized. The coupling elements and the output shaft will therefore be driven in the reverse direction.

Means are provided for disconnecting the torque-sensitive elements of the adjustable transmission when driven in its reverse direction so that a stable gear ratio will be maintained in reverse drive. In the present embodiment, this means comprises a switch 109 in series with one of the conductors 111 between ratio selector 97 and positioning motor 98. Switch 109 is normally closed so that control of motor 98 by selector 97 is effective. A relay 112 controls switch 109 and is placed in parallel with the energizing winding of reverse drive gear clutch 103. When clutch 103 is energized, relay 112 is also energized and acts to open switch 109, disconnecting ratio selector 97 from motor 98. Pinions 91 and 92 will therefore remain in the position assumed during the immediately preceding forward driving condition, and output shaft 85 will be driven in a reverse direction at this gear ratio. When forward drive is again desired switch 107 is moved to deenergize clutch 103 and energize clutch 102. Relay 112 is thus deenergized and switch 109 again closed to reenable the variable transmission.

It should be kept in mind that the particular electrical circuit shown in Figure 3 could be varied within the scope of the invention. In particular, the invention contemplates the provision of means for establishing the same gear ratio whenever a reverse drive is set up.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a transmission having an input power shaft, a rotary driven member, a coupling member connected to said input shaft and operative to engage said driven member, means for comparing the torque on the input shaft and the torque on said driven member and deriving a differential signal therefrom, drive means for selectively positioning said coupling member in engagement with different locus diameters on said driven member, and means responsive to said signal for controlling said drive means.

2. In a transmission having an input power shaft, a rotary driven member having a plurality of ring gears at various locus diameters, a coupling member comprising a pinion connected to said input shaft and operative to engage said driven member, means for comparing the torque on said input shaft and the torque on said driven member and deriving a differential signal therefrom, drive means for selectively positioning said pinion to mesh with said ring gears, and means responsive to said signal for controlling said drive means.

3. In a transmission having an input shaft, a driven member having a plurality of engageable means thereon, a coupling member operatively connected to the input shaft of the transmission and adapted to engage said engageable means, driven means for selectively positioning said coupling member into engagement with said engageable means, and means for controlling said driven means in accordance with the degree of unbalance between the input shaft torque and the torque on said driven member.

4. In a transmission, a power input shaft, a driven member axially aligned with said input shaft and having a plurality of ring gears at various locus diameters thereon, a coupling gear operatively connected to said input shaft in driven relation thereto, said coupling gear being slidably supported adjacent said driven member and adapted to selectively mesh with said ring gears, and means for selectively and slidably positioning said coupling gear in meshing engagement with said ring gears, said last named means including means for controlling the positioning of said coupling gear in accordance with the ratio of torque on said input shaft to torque on said driven member.

5. A device as defined in claim 4, said driven member comprising a conical member having said ring gears formed at different locus diameters on the side thereof.

6. A device as defined in claim 5, further provided with a shaft supporting said coupling gear for sliding movement in a direction parallel with the side of said conical member, said input shaft and conical member having a common axis, and drive means between said input shaft and said coupling gear suport shaft.

7. In a transmission, an input power shaft, a rotary driven member having an output shaft secured thereto, a coupling member connected to said input shaft and operative to engage said driven member, means for supporting said coupling member for movement along a line parallel to portions of said driven member and into selective engagement with said driven member at different locus diameters thereon, measuring means connected to the input and output shafts for producing signal indications of the instantaneous torque in said shafts, ratio selector means operative to receive said signal indications and produce a differential control signal, and a positioning mechanism connected to said ratio selector and responsive to the control signal for varying the position of the coupling member, whereby the drive ratio between the input and output shafts is adjusted.

8. A device as defined in claim 7, said positioning mechanism including a reversible drive means connected to said ratio selector, a threaded shaft driven by said reversible drive means, and a traveling nut cooperating with said threaded shaft and connected to said coupling member for slidably moving the coupling member relative to the driven member.

9. In a transmission having an input power shaft, a driven member having a plurality of ring gears located on different locus diameters thereon, a coupling shaft mounted adjacent said ring gears and in driven relation with the input shaft, a pair of pinions rotatably mounted on said coupling shaft and adapted to selectively mesh with said ring gears, a pair of clutches mounted on said coupling shaft adjacent said pinions to connect said pinions individually to said coupling shaft, and means for selectively energizing said clutches in accordance with the relative position of said pinions and said ring gears, said selective means allowing free rotation of a pinion whenever its meshing engagement with a ring gear is less than a predetermined amount and connecting a pinion with said coupling shaft whenever its meshing engagement with a ring gear is greater than a predetermined amount.

10. The combination according to claim 9, further provided with a support for said clutches and pinions, said support being slidably mounted on said coupling shaft, and power driven means for slidably positioning said support on said coupling shaft.

11. The combination according to claim 9, said pinions being adjacent each other, said ring gears having substantially the same thickness and spacing as the thickness of each pinion.

12. In a transmission, an input power shaft, a driven member having an output shaft secured thereto, a plurality of gears formed at different locus diameters on said driven member, a coupling member operatively connected to said input shaft and adapted to mesh with said gears on the driven member, means for slidably positioning said coupling member in selective meshing engagement with said gears, said means for positioning the coupling member including measuring means for producing a signal indication of the torque at said input and output shafts, a differential ratio selector connected to said measuring means for receiving said signal indications and producing a differential control signal, a threaded shaft, a traveling nut carried by said threaded shaft and connected to said coupling member for slidably moving the coupling member relative to the gears, and a reversible motor operatively connected to said threaded shaft for rotatably driving the shaft, said reversible motor being electrically connected to said differential ratio selector and responsive to said control signal.

13. In a transmission having an input power shaft, a driven member having a plurality of power transmission elements located on different locus diameters thereof, a coupling shaft adjacent said elements and in driven relation with the input shaft of the transmission, mounting means slidably carried on said coupling shaft, a plurality of coupling members rotatably mounted on said mounting means and operative to engage said elements, energizable means mounted on said mounting means adjacent each of said coupling members and operative when energized to connect a coupling member to said coupling shaft, and means for selectively energizing said energizable means in accordance with the relative position of said coupling members and said power transmission elements.

14. A device as defined in claim 13, further provided with means for selectively energizing said energizable means including a control terminal board having a plurality of contact segments thereon connected to a power source, and a pair of contacts adapted to individually engage selected contact segments in accordance with the positioning of the coupling members, each of said contacts being electrically connected to one of said energizable means.

15. In a transmission having an input power shaft, a driven member having a plurality of gears located on different locus diameters thereof, a coupling shaft mounted adjacent said gears, a pair of magnetically operated clutches and a pair of coupling pinions slidably carried on said coupling shaft, each of said pinions being rotatably mounted on said shaft and operative to be engaged by a clutch during energization thereof for driving said gears, means for selectively and slidably positioning said pinions in meshing engagement with said gears responsive to an unbalance between the torque on the input shaft and the torque on the driven member, and means for selectively energizing said magnetically operated clutches in accordance with the relative positioning of said pinions and gears, said last named means including a pair of contacts moving with said pinions and a plurality of contact segments connected to a power source and adapted to be engaged by the contacts.

16. In a transmission, a power input shaft, a driven member axially aligned with said input shaft aand having a plurality of ring gears at various locus diameters thereon, a coupling gear, means for selectively connecting said coupling gear to said input shaft for rotation in opposite directions, said coupling gear being slidably supported adjacent said driven member and adapted to selectively mesh with said ring gears, and means for selectively and slidably positioning said coupling gear in meshing engagement with said ring gears, said last named means including means for controlling the positioning of said coupling gear in accordance with the ratio of torque on said input shaft to torque on said driven member.

17. The combination according to claim 16, said first-mentioned means comprising a pair of driving gears rotatably mounted on said input shaft, an intermediate gear connected to said coupling gear, one of said driving gears meshing directly with said intermediate gear, an idle gear between the other of said driving gears and said intermediate gear, and a pair of selectively actuatable clutches between said input shaft and said driving gears.

18. In a transmission, an input power shaft, a rotary driven member having an output shaft secured thereto, a rotary coupling member connected to said input shaft and operative to engage said driven member, means for supporting said coupling member for axial movement along a line parallel to portions of said driven member and into selective engagement with said driven member at different locus diameters thereon, measuring means connected to the input and output shafts for producing signal indications of the instantaneous torque in said shafts, ratio selector means operative to receive said signal indications and produce a differential control signal, a positioning mechanism connected to said ratio selector and responsive to the control signal for varying the position of the coupling member, whereby the drive ratio between the input and output shafts is adjusted, means for selectively causing rotation of said coupling member in opposite directions with respect to the rotation of said input shaft, and means responsive to the selection of one direction of rotation of said coupling member for breaking the connection between said ratio selector and said positioning mechanism to disenable the latter.

19. In a transmission, an input shaft, an output shaft, a rotary member connected to one of said shafts, a coupling member connected to the other shaft and operative to engage said rotary member, means for comparing the torque on said shafts and deriving a differential signal therefrom, drive means for selectively positioning said coupling member in engagement with different locus diameters on said rotary member, and means responsive to said signal for controlling said drive means.

20. In a transmission, an input shaft, an output shaft, a plurality of cone-shaped gears of varying diameters fixed to one of said shafts, a coupling gear, a shaft supporting said coupling gear for sliding movement in a direction parallel with the faces of said conical gears whereby said coupling gear is adapted to selectively mesh with said conical gears, drive means between said coupling gear shaft and the other of said input and output shafts, and means for selectively and slidably positioning said coupling gear in meshing engagement with said conical gears, said last-named means including means for controlling the positioning of said coupling gear in accordance with the relative torques on said input and output shafts.

21. In a transmission, an input shaft, an output shaft, a plurality of cone-shaped gears of varying diameters fixed to one of said shafts, a coupling shaft extending parallel to the faces of said gears, a drive connection between said coupling shaft and the other of said input and output shafts, a pair of pinions rotatably mounted on said coupling shaft and adapted to selectively mesh with said cone-shaped gears, a pair of clutches mounted on said coupling shaft adjacent said pinions to connect said pinions individually to said coupling shaft, means for selectively energizing said clutches in accordance with the relative positions of said pinions and said gears, said selective means allowing free rotation of a pinion whenever its meshing engagement with a gear is less than a predetermined amount and connecting a pinion with said coupling shaft whenever its meshing engagement with a gear is greater than a predetermined amount, means supporting said pinions and clutches on said coupling shaft for sliding movement as a unit therealong, and means for selectively positioning said supporting means on said coupling shaft in accordance with the ratio of torques on said input and output shafts.

22. In a transmission, an input shaft, an output shaft, a plurality of rings of gear teeth of varying diameters fixed to one of said shafts, a coupling shaft extending parallel to the faces of said rings of gear teeth, a drive connection between said coupling shaft and the other of said input and output shafts, a pair of pinions mounted for independent rotation on said coupling shaft and adapted to selectively mesh with said rings of gear teeth, a pair of clutches mounted on said coupling shaft adjacent said pinions to connect said pinions individually with said coupling shaft, and means for selectively energizing said clutches in accordance with the relative position of said pinions and rings of gear teeth, said selective means allowing free rotation of a pinion whenever its meshing engagement with a rings of gear teeth is less than a predetermined amount and connecting a pinion with said coupling shaft whenever its meshing engagement with a rings of gear teeth is greater than a predetermined amount.

23. The combination according to claim 22, further provided with a cone-shaped element having said rings of gear teeth formed on a surface thereof, and means for moving said pair of pinions along said coupling shaft, said last-named means comprising a support for said clutches and pinions slidably mounted on said coupling shaft, a screw shaft mounted for rotation on an axis parallel to said coupling shaft, an electric motor and gear reduction means adapted to drive said screw shaft in either direction, and a guide nut mounted for travel on said screw shaft and operatively connected to said support.

References Cited in the file of this patent

UNITED STATES PATENTS

| | | |
|---|---|---|
| 898,327 | Couch | Sept. 8, 1908 |
| 958,061 | Adams | May 17, 1910 |
| 1,338,974 | Bucknam | May 4, 1920 |

UNITED STATES PATENT OFFICE

CERTIFICATE OF CORRECTION

Patent No. 2,807,964                                          October 1, 1957

Stanford R. Ovshinsky

It is hereby certified that error appears in the printed specification of the above numbered patent requiring correction and that the said Letters Patent should read as corrected below.

Column 4, line 59, for "outupt" read -- output --; column 7, line 75, for "suport" read -- support --; column 10, lines 65 and 68, for "rings", each occurrence, read -- ring --.

Signed and sealed this 24th day of December 1957.

(SEAL)
Attest:

KARL H. AXLINE                                             ROBERT C. WATSON
Attesting Officer                                      Commissioner of Patents